(12) United States Patent
Rutherford et al.

(10) Patent No.: US 7,237,439 B1
(45) Date of Patent: Jul. 3, 2007

(54) PRESSURE SENSOR OVER-PRESSURE PROTECTION

(76) Inventors: Robert B. Rutherford, 5 Shady Oaks Dr., Folsom, CA (US) 95630; Mike Levenson, 25 Yale Rd., Pembroke, MA (US) 02359

( * ) Notice: Subject to any disclaimer, the term of this patent is extended or adjusted under 35 U.S.C. 154(b) by 0 days.

(21) Appl. No.: 11/361,637

(22) Filed: Feb. 23, 2006

Related U.S. Application Data

(60) Provisional application No. 60/656,119, filed on Feb. 23, 2005.

(51) Int. Cl.
*G01L 7/04* (2006.01)
*G01M 17/02* (2006.01)

(52) U.S. Cl. .................... 73/732; 73/146; 73/146.3; 73/146.8

(58) Field of Classification Search .......... 73/700–756, 73/146–146.8; 340/442–447
See application file for complete search history.

(56) References Cited

U.S. PATENT DOCUMENTS

| | | | |
|---|---|---|---|
| 3,523,451 A * | 8/1970 | Kohn | .................... 73/146.8 |
| 3,789,867 A | 2/1974 | Yabor | |
| 3,873,965 A | 3/1975 | Garcia | |
| 3,969,936 A | 7/1976 | Lindsay | |
| 3,990,309 A | 11/1976 | Beckwith | |
| 4,051,803 A | 10/1977 | Arnone | |
| 4,248,080 A | 2/1981 | Chuck | |
| 4,270,568 A | 6/1981 | Gray | |
| 4,279,161 A | 7/1981 | Huston | |
| 4,606,391 A | 8/1986 | Achterholt | |
| 4,619,137 A | 10/1986 | Bott | |
| 4,723,445 A | 2/1988 | Ripley | |
| 4,763,516 A | 8/1988 | Greenspan | |
| 4,773,270 A | 9/1988 | Ogasawara | |
| 4,924,697 A | 5/1990 | Hunt | |
| 4,953,395 A | 9/1990 | Jard | |
| 4,970,491 A | 11/1990 | Saint | |
| 5,040,562 A | 8/1991 | Achterholt | |
| 5,357,242 A | 10/1994 | Morgano | |
| 5,365,967 A | 11/1994 | Moore | |
| 5,377,539 A | 1/1995 | LaSalle | |
| 5,503,012 A | 4/1996 | Rabizadeh | |
| 5,694,111 A | 12/1997 | Huang | |
| 5,898,379 A * | 4/1999 | Vanbergeijk | ................ 340/680 |

(Continued)

OTHER PUBLICATIONS

Spiragage Plus product description.

*Primary Examiner*—Edward Lefkowitz
*Assistant Examiner*—Jermaine Jenkins
(74) *Attorney, Agent, or Firm*—Heisler & Associates

(57) ABSTRACT

A gauge is provided for monitoring pressure of air or other gases within a tire or other gas containing chamber. A gauge includes a receiver attachable to a valve stem of the tire. A valve core is also provided on the gauge through which fill air can be directed. In this way, the gauge does not need to be removed during filling of the tire with air. A pathway extends from the valve core to the receiver within the gauge. A pressure sensor, such as a Bourdon tube, is coupled to this pathway and monitors pressure within the tire. A sensor protector is located within the path and adjacent the Bourdon tube or other pressure sensor to protect the Bourdon tube or other pressure sensor from over-pressure air or other gases that could damage the Bourdon tube or other pressure sensor.

29 Claims, 6 Drawing Sheets

U.S. PATENT DOCUMENTS

| | | |
|---|---|---|
| 5,965,822 A | 10/1999 | Wu |
| 6,085,595 A | 7/2000 | Ferguson |
| 6,119,525 A | 9/2000 | Hamma |
| 6,843,115 B2 | 1/2005 | Rutherford |
| 7,040,152 B2 | 5/2006 | Rutherford |

* cited by examiner

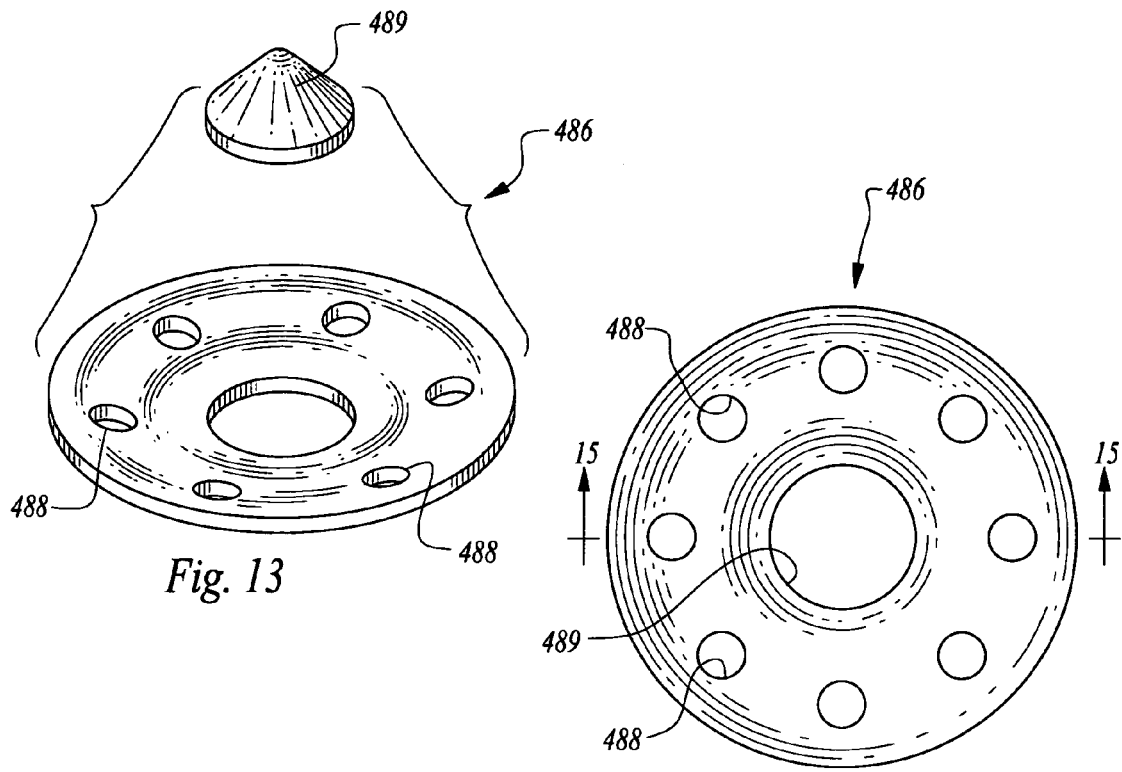
Fig. 13
Fig. 14
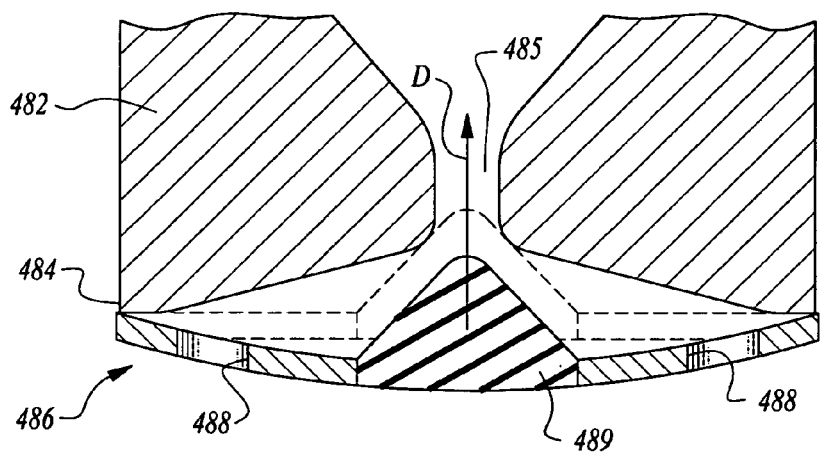
Fig. 15

PRESSURE SENSOR OVER-PRESSURE PROTECTION

CROSS-REFERENCE TO RELATED APPLICATIONS

This application claims benefit under Title 35, United States Code §119(e) of U.S. Provisional Application No. 60/656,119 filed on Feb. 23, 2005.

FIELD OF THE INVENTION

The following invention relates to pressure gauges and particularly pressure gauges adapted to be attached to tires and other similar gas filled chambers. More particularly, this invention relates to pressure gauges which include a valve core which allows fill air to be routed through the gauge and into the chamber to which the gauge is attached, and which additionally feature protection for a pressure sensing element so that fill air above a maximum pressure for the pressure sensing element is prevented from damaging the pressure sensing element.

BACKGROUND OF THE INVENTION

One important criteria for safely operating a motor vehicle is the maintenance of proper pressure within tires of the vehicle. If tire pressure is not maintained, fuel economy is adversely affected and rates of tire wear increase. Additionally, handling of the vehicle can be adversely affected and the potential for abrupt failure of the tire is increased. Hence, it is advisable to monitor the pressure within vehicle tires on a regular basis.

One of the difficulties encountered in such regular tire pressure monitoring is that a significant amount of time is associated with monitoring tire pressure. In particular, a safety cap must be removed from the valve stem (and not misplaced). The gauge must be placed upon the valve stem of the tire. Care must be taken to make sure that a significant amount of air is not lost from the tire during this gauge installation process. The pressure can then be read from the gauge. If the tire pressure is adequate, the procedure is completed for that tire and the next tire can be checked. On a vehicle with multiple tires, this basic routine can be significantly time consuming, decreasing the likelihood that tire pressure monitoring will occur on a sufficiently frequent basis.

Compounding this difficulty is the inconvenience encountered when tire pressure is low and air needs to be added to the tire. First the gauge is removed. Then the vehicle is brought into proximity with a source of compressed air. Then compressed air is added to the tire. Unless an accurate gauge is associated with the source of compressed air, the source of compressed air must be removed after a relatively short period of time and the pressure gauge reinserted on the valve stem to take another reading. Typically, a half a dozen or so filling steps and measuring steps are involved before the tire pressure has been brought to the proper level.

It is known in the prior art to provide tire pressure gauges which are mountable upon a valve stem and which are sufficiently small and lightweight that they can remain mounted to the tire during operation of the tire. While this solves a portion of the problem, the difficulty associated with adding air to the tire is not alleviated. In at least two prior art patents, tire pressure gauges are taught which further allow for a source of compressed air to pass into the valve stem of the tire while the gauge remains upon the valve stem.

In particular, U.S. Pat. No. 5,377,539 to LaSalle and U.S. Pat. No. 4,924,697 to Hunt (each incorporated herein by reference in their entirety) disclose tire pressure gauges which can mount on a valve stem of a tire and which also include a port through which compressed air can be added without removing the tire pressure gauge.

Bourdon tubes are susceptible to de-calibration or other damage if gas having a pressure greater than a maximum pressure for which the Bourdon tube is calibrated is encountered by the Bourdon tube or other pressure sensor. For instance, many Bourdon tubes are calibrated to accurately read pressures between 0 psi (pounds per square inch) and 60 psi. If air or other gases having a pressure greater than 60 psi pass into the Bourdon tube, the Bourdon tube becomes uncoiled beyond an elastic limit of the Bourdon tube so that the Bourdon tube becomes permanently deformed. The Bourdon tube then typically ceases to accurately read pressure through an indicator portion thereof. Other failure modes also exist including rupture of the Bourdon tube so that it does not provide any reading whatsoever thereafter. The problem of Bourdon tube damage and de-calibration is particularly pernicious in that in some over-pressure failure modes, the Bourdon tube may appear to be functioning properly, when in fact it has become de-calibrated.

Many sources of fill air or other fill gas are provided at very high pressures (as high as 250 psi or higher). With such high pressure fill air, tires or other chambers can be quickly filled. However, such high pressure fill air/gas sources provide a serious threat to the proper function of a Bourdon tube, or many other types of pressure sensors. The patents to LaSalle and Hunt fail to address this problem. Accordingly, a need exists for a gauge including an over-pressure protector to protect the pressure sensor from experiencing pressures greater than a maximum pressure for the sensing element.

SUMMARY OF THE INVENTION

With this invention a gauge is provided which can both sense pressure within a tire or other air filled chamber and allow air (or other gas) to be filled into the tire with the gauge remaining in place upon a valve stem of the tire. The gauge includes a pressure sensor, such as a Bourdon tube, which is shielded by a sensor protector so that over-pressure fill air does not damage the sensor element while the fill air is passing through the gauge and into the tire.

The gauge generally includes a receiver adapted to be mounted to a valve stem of a tire or other chamber to be filled with air. This receiver is preferably configured so that it can be mounted to the valve stem and remain upon the valve stem both during a filling procedure and preferably also after the filling procedure and during operation of the tire. A valve core is also provided on the gauge with a fluid path extending between the valve core and the receiver so that air or other gas from a source of fill air/gas coupled to the valve core can pass from the valve core, along the path, through the receiver and into the tire without requiring removal of the gauge.

A pressure sensor, such as a Bourdon tube, has an open inner end thereof coupled to a port adjacent the path between the valve core and the receiver. The sensor protector is adjacent this port so that over-pressure air is prevented from passing into the Bourdon tube or other pressure sensor.

The sensor protector according to a first embodiment includes a divider wall spacing the inner end of the Bourdon tube from a bypass path for air/gas passing from the valve core to the receiver. The bypass path is only in communication with the inner end of the Bourdon tube at a location downstream of the divider wall, such that a Venturi effect is created, causing a reduced pressure zone to be located adjacent the inner end of the Bourdon tube while the high pressure air is flowing through the bypass path and adjacent the divider wall.

In a second embodiment, the sensor protector is in the form of a slide/spring assembly which blocks the port leading to the inner end of the Bourdon tube when a dangerously high pressure exists within the path, and allows access between the path and the port leading to the inner end of the Bourdon tube or other pressure sensor when pressure within the path is below a maximum pressure for the pressure sensor.

In a third embodiment, the sensor protector is in the form of a filter flow protector which is in the form of a porous mass either within the path between the valve core and the receiver or within the port leading to the inner end of the Bourdon tube or other sensor element. This porous mass has sufficiently tortuous pathways extending therethrough that friction losses encountered by the flowing high pressure fill air/gas cause a sufficient pressure reduction to make the pressure actually experienced by the Bourdon tube or other pressure sensor reduced to a safe level. When flow has ceased, static pressure through the porous mass is constant on both sides of the porous mass such that accurate pressure readings are obtained.

In a fourth embodiment, a flexible plate is provided overlying an entrance into the port leading to the inner end of the Bourdon tube or other sensor element. This flexible plate can flex between an open position and a closed position sensitive to pressure within the path between the valve core and the receiver. When the pressure is above a threshold maximum pressure, the flex plate flexes to a closed position and blocks the entrance to the inner end of the Bourdon tube or other pressure sensor. When the pressure within the path is below this threshold pressure, the flex plate flexes to an open position allowing air to flow into the Bourdon tube or other pressure sensor.

OBJECTS OF THE INVENTION

Accordingly, a primary object of the present invention is to provide a pressure gauge attachable to a tire and which allows fill air to pass through the gauge and into the tire without removal of the gauge and dangerously high pressure fill air prevented from causing damage to a pressure sensing element within the gauge.

Another object of the present invention is to provide a Bourdon tube with an over-pressure protector adjacent an inner end thereof which protects the Bourdon tube from experiencing damagingly high pressure.

Another object of the present invention is to provide a method for filling a tire without requiring removal or replacement of a gauge and without damaging a pressure sensor of the gauge even when fill air is provided at a pressure greater than a maximum safe pressure for the pressure sensor of the gauge.

Another object of the present invention is to provide a tire pressure gauge which can remain mounted upon a tire during operation of the tire and while filling the tire with a sensor element within the gauge protected against over-pressure during filling of the tire with fill air/gas at a higher pressure than a maximum pressure that the sensor element can safely encounter.

Another object of the present invention is to provide a tire pressure gauge or gauge for other air/gas filled chambers which can remain upon a valve stem of the tire/chamber during filling of the chamber.

Other further objects of the present invention will become apparent from a careful reading of the included drawing figures, the claims and detailed description of the invention.

BRIEF DESCRIPTION OF THE DRAWINGS

FIG. 13 is a detail of a portion of that which is shown in FIG. 12.

FIG. 14 is a plan view of a disc providing a preferred form of flexible plate according to this fourth embodiment gauge of this invention.

FIG. 15 is a side elevation view of that which is shown in FIG. 14, shown in full section.

DESCRIPTION OF THE PREFERRED EMBODIMENT

Figure 1:
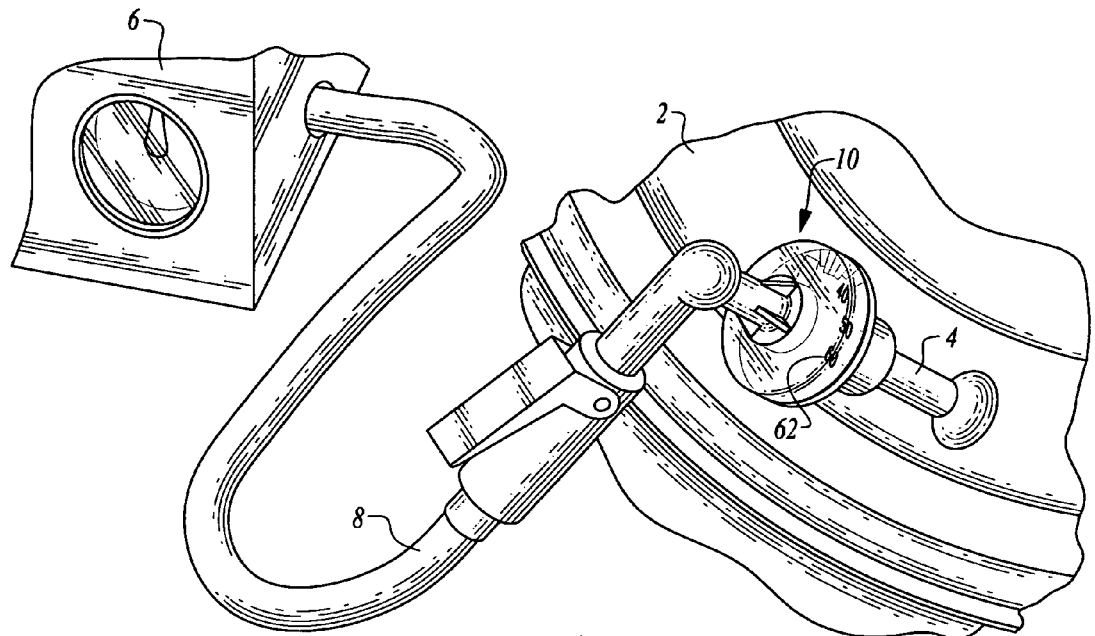
FIG. 1 is a perspective view of a wheel and tire combination with a gauge of this invention coupled thereto and with an air compressor and hose shown filling the tire through the gauge of this invention.

Referring to the drawings, wherein like reference numerals represent like parts throughout the various drawing figures, reference numeral 10 (FIGS. 1 and 2) is directed to a tire pressure gauge 10 according to a first embodiment of this invention. The gauge 10 is configured to be mountable to a chamber of compressed air or gas, such as a tire 2 through a valve stem 4 thereof. The gauge 10 is also configured to allow compressed air or other gas to be delivered into the tire 2 through the gauge 10. For instance, an air compressor 6 can supply compressed air through a hose 8 which is attachable to the gauge 10 for filling of the tire 2 through the gauge 10. In this way, the gauge 10 does not need to be removed during the tire 2 filling process. Rather, the gauge 10 can remain upon the tire 2 during the filling process, and preferably also during operation of the tire 2. The gauge 10 is additionally configured to protect a pressure sensor, such as a Bourdon tube 100, within the gauge 10 from over-pressure that may exist from air or other gas supplied by the compressor 6 or other source of compressed air/gas. Thus, the pressure sensor within the gauge 10 is protected from damage during the filling process.

Figure 2:
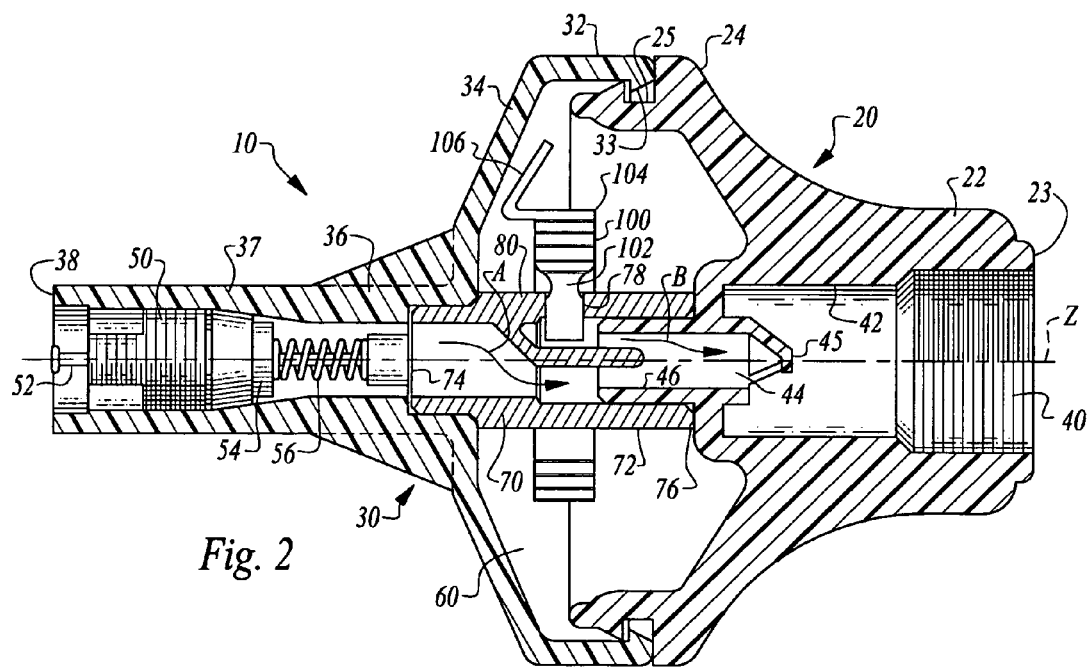
FIG. 2 is a full sectional view of the gauge of this invention according to a first embodiment.
Figure 3:
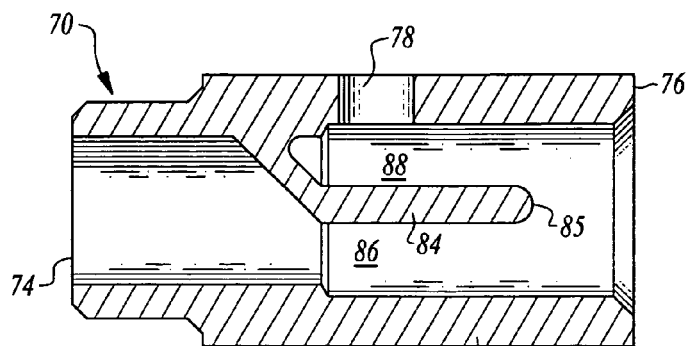
FIG. 3 is a full sectional view of a central column of the embodiment of FIG. 2 featuring a venturi sensor protector interposed between a valve core and receiver of the gauge.
Figure 4:
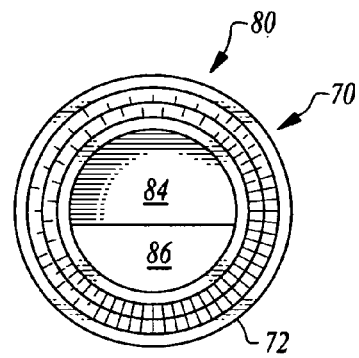
FIG. 4 is a left end view of that which is shown in FIG. 3.
Figure 5:
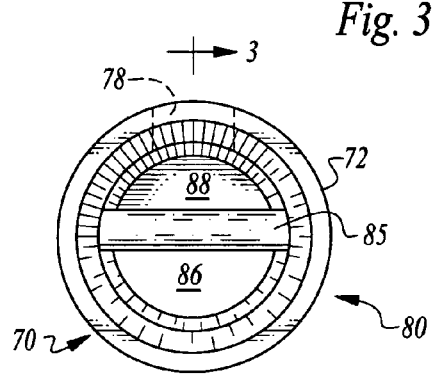
FIG. 5 is a right end view of that which is shown in FIG. 3.

In essence, and with particular reference to FIG. 2, basic details of the gauge 10 are described according to a first embodiment. The gauge 10 is preferably formed from a lower body 20 coupled to an upper body 30. A receiver 40 is located in the lower body 20 and is adapted to be attachable to the valve stem 4 of the tire 2 or other elevated pressure air/gas chamber. A valve core 50 is provided upon the upper body 30 with the valve core 50 adapted to be coupled to a source of compressed air such as an air compressor 6, through a hose 8 or other delivery structure.

A chamber 60 is provided between the lower body 20 and the upper body 30. This chamber provides a location for the pressure sensing element, such as a Bourdon tube 100. At least a portion of the upper body 30 is preferably transparent so that a position of the Bourdon tube 100 can be viewed for reading pressure indicated by the pressure sensor. A column 70 extends along a centerline of the gauge 10 and through the chamber 60. The column 70 defines a path for compressed air to flow between the valve core 50 and the receiver 40 through the gauge 10. In the first embodiment represented by the gauge 10, the sensor protector is in the form of a venturi protector 80 within the column 70. In other embodiments, this venturi protector 80 is replaced with other forms of sensor protectors according to other embodiments of this invention. The venturi protector 80 or other sensor protector is located adjacent the Bourdon tube 100 or other pressure sensor and ensures that dangerously high pressures for the Bourdon tube 100 do not pass from the path within the column 70 into the Bourdon tube 100 so that the Bourdon tube 100 is effectively protected.

More specifically, and with particular reference to FIGS. 2–5, particular details of the gauge 10 are described according to the first embodiment. While the gauge 10 is preferably formed from two separate bodies including the lower body 20 and the upper body 30, the particular configuration of these bodies 20, 30 or the number of subassemblies making up various parts of the gauge 10 could be altered consistent with the scope of this invention. Most preferably, the lower body 20 and upper body 30 are each formed of a plastic material or other lightweight easily formable material which is at least partially transparent for viewing of a pressure sensor element within the chamber 60 of the gauge 10.

Most preferably, the lower body 20 is substantially radially symmetrical about a central axis Z and includes a neck 22 at a base 23 defining a portion of the lower body 20 adapted to be placed adjacent the valve stem 4 of the tire 2. The lower body 20 extends away from the base 23 from the neck 22 to a shoulder 24 which defines a greatest diameter portion of the lower body 20. A groove 25 is preferably formed within the shoulder 24 which facilitates connection to the upper body 30.

The upper body 30 is in many ways similar in form to the lower body 20 except that it is reversed. In particular, the upper body 30 includes a rim 32 having a diameter similar to that of the shoulder 24 of the lower body 20. A tooth 33 extends inwardly from the rim 32 slightly and is sized to snap into the groove 25 and the shoulder 24. The rim 32 and tooth 33 can either be bonded to the groove 25 and shoulder 24 or be fitted with a sealing element and exhibit a friction fit or sufficiently tight fit so that an airtight seal is provided between the upper body 30 and the lower body 20. In this way, should the pressure sensor fail in a way which leaks pressurized air or other gas into the chamber 60, the lower body 20 and upper body 30 can contain this pressure and prevent leakage of air or other gas out of the tire 2.

The upper body 30 transitions from the rim 32 to the trunk 36 in a generally conical fashion and defining a window 34 for viewing into the chamber 60. At a minimum, this window 34 is at least partially transparent for viewing of the Bourdon tube 100 or other pressure sensor within the chamber 60. Optionally, other portions of the upper body 30 and lower body 20 can also be formed of transparent material. The window 32 transitions to the trunk 36 which extends to a collar 37 which in turn extends to a tip 38. The tip 38 defines a portion of the upper body 30 most distant from the rim 32 and most distant from the lower body 20. The various parts of the upper body 30 are each preferably substantially radially symmetrical about the central axis Z.

A receiver 40 is supported within the lower body 20 and along the central axis Z. This receiver 40 is particularly configured so that it can be coupled to a valve stem 4 of a tire 2, preferably in a semi-permanent fashion so that the gauge 10 can remain upon the tire 2 during use. The receiver 40 includes a cylindrical bore wall 42 with a diameter similar to that of the valve stem 4. An inlet 44 is located at an inner end of the receiver 40 which is open to a path within the column 70 and extending to the valve core 50, so that fill air can pass through the inlet 44, through the receiver 40 and into the valve stem 4 of the tire 2.

Most preferably, a post 45 is located adjacent the inlet 44. This post 45 is configured to depress a valve on the valve stem 4 so that fluid communication exists between the path within the column 70, through the inlet 44 and through the valve stem 4 into the tire 2. A cylinder 46 preferably extends beyond the inlet 44 with the cylinder 46 aligned with the central axis Z and extending toward the upper body 30. This cylinder 46 provides a convenient support for the column 70 so that the column 70 can be sandwiched between the lower body 20 and upper body 30 and surrounding the cylinder 46, while also captured at an opposite end by the upper body 30, so that fasteners are not required to capture the column 70 between the lower body 20 and the upper body 30.

Should the receiver 40 be required to attach to a valve stem 4 of a different size or configuration, the receiver 40 would be appropriately modified so that it could be effectively attached to any such alternative valve stem. The receiver 40 could include threads to thread onto the valve stem 4 or resilient liners such as of soft rubber which would allow for a tight friction fit between the receiver 40 and the valve stem 4 and a secure seal between the receiver 40 and the valve stem 4, so that leakage is precluded when the gauge 10 remains upon the valve stem 4 for prolonged periods.

The upper body 30 preferably includes the valve core 50 therein. In particular, the collar 37 of the upper body 30 has a hollow cylindrical form sized so that the valve core 50 can be press fit therein. The valve core 50 could alternatively be threaded into the collar 37 should appropriate threads be formed on the collar 37 or the valve core 50 or both.

The valve core 50 typically includes a needle adjacent the tip 38 coupled to a valve assembly 54 and spring biased with a spring 56 toward a closed position. When the needle 52 is depressed, the valve assembly 54 is opened. When forces are removed from the needle 52, the spring 56 causes the needle 52 to return to its original position and the valve assembly 54 to be closed. Various different forms of valve cores 50 are known, with many such suitable valve cores being effective for this invention. Most preferably, the valve core 50 has a form similar to that of a typical valve stem 4 of a tire 2, so that common hoses 8 can be readily coupled to the valve core 50 in the same manner that they would otherwise be coupled to the valve stem 4 of the tire 2. For instance, the valve core 50 can be configured to be compatible with a standard Schraeder fitting.

The chamber 60 is defined by an open region between portions of the lower body 20 and the upper body 30 and is generally circular in form in a mid portion of the gauge 10. This chamber 60 includes the Bourdon tube 100 or other pressure sensor therein. This chamber 60 is also preferably sealed sufficiently so that should the Bourdon tube 100 or other pressure sensor leak, this leak will not result in loss of air from the tire 2, but rather will be contained within the chamber 60.

The column 70 is configured as a generally hollow cylindrical construct extending from the cylinder 46 of the receiver 40 to the downstream end of the valve core 50. The column 70 defines a general form of path leading from the valve core 50 to the receiver 40 along which compressed air flows when the tire 2 is being filled through the gauge 10. This basic column 70 includes a cylindrical wall 72 oriented aligned with the central axis Z and substantially closed along the cylindrical wall 72 from a nose 74 adjacent the upper body 30 to a tail 76 adjacent the lower body 20. A side port 78 is formed in the column 70. This side port 78 provides a junction to which the Bourdon tube 100 or other pressure sensor can be attached so that a pressure of air within the tire 2 can be sensed.

The column 70 generally includes the features described above. Additionally, the column 70 of this first embodiment further includes details of the venturi sensor protector 80 therein. These details of the venturi sensor protector 80 are integrally formed with other portions of the column 70 described above in this first embodiment, but could alternatively be formed separately and merely added to the column 70. In other embodiments, the column 70 is modified as necessary to receive a different pressure sensor protector according to the different embodiments.

The venturi sensor protector 80 includes a divider wall 84 which divides the path between the valve core 50 and the receiver 40 into a bypass path 86 on one side of the divider wall 84 and a venturi space 88 on an opposite side of the divider wall 84. The divider wall 84 begins with a diagonal portion extending from the cylindrical wall 72 of the column 70. The divider wall 84 then transitions into a portion which extends in a fashion aligned with the central axis Z. The divider wall 84 terminates at a tip 85. Adjacent the tip 85 both the bypass path 86 and venturi space 88 come together. The venturi space 88 is located adjacent the side port 78 of the column 70 so that the divider wall 84 effectively isolates the side port 74 from the bypass path 86.

In operation, as high pressure air is rapidly flowing from the valve core 50 to the receiver 40 to fill the tire 2, this air is caused to pass along the bypass path 86 (along arrow A of FIG. 2) when passing through the column 70. The narrowing of the bypass path 86 further enhances a velocity of the air passing along the bypass path and adjacent the divider wall 84. In contrast, the venturi space 88 is characterized by static air. Through utilization of the Bernoulli Principle that pressure decreases with increased velocity, the venturi space 88 experiences a decrease in pressure due to the high velocity air passing along the bypass path 86 and past the tip 85 of the divider wall 84. The bypass path 86 would tend to suck air out of the venturi space 88 somewhat (along arrow B of FIG. 2) causing the reduced pressure within the venturi space 88.

A degree to which pressure within the venturi space 88 is less than pressure within the bypass path 86 is a function of the velocity of the air passing along the bypass path 86. Other factors including the geometry of the divider wall 84 and a geometry of the venturi space 88 and bypass path 86 can be selected by experimentation or calculation to optimize the pressure differential between the venturi space 88 and the bypass path 86. At a minimum, the venturi sensor protector 80 is preferably configured so that pressure within the venturi space 88 is sufficiently lower than pressure within the bypass path 86 so that pressure within the venturi space 88 is less than a maximum safe pressure for the pressure sensor, such as the Bourdon tube 100, even when fill air passing from the air compressor 6 through the valve core 50 and on to the receiver 40 is above a safe pressure for the Bourdon tube 100 or other pressure sensor. Rather, the Bourdon tube 100 or other pressure sensor would experience a lower pressure than that within the bypass path 86 and would remain safe.

During the filling procedure, the Bourdon tube 100 or other pressure sensor would be reading a lower pressure than exists within the bypass path 86, and a pressure which is at least partially correlated with a pressure within the tire 2. However, when the flow of air is stopped, such as by actuating a valve upon the hose 8 (FIG. 1) the stoppage of air within the bypass path 86 would cause an equilibrium condition between an interior of the tire 2 and the Bourdon tube 100 or other pressure sensor, so that an accurate reading could be obtained. If an undesirably low pressure still exists within the tire 2, the valve would then be reopened to further pass air into the tire 10. However, the hose 8 would never need to be removed from the gauge 10, and the gauge 10 would never need to be removed from the valve stem 4 of the tire 2.

Through experience or careful design of the venturi protector 80, it is conceivable that the venturi protector 80 could be appropriately configured and calibrated so that the Bourdon tube 100 or other pressure sensor would in fact read a pressure close to if not exactly the same as a pressure within the tire 10 even during the filling process and while elevated pressure air is flowing into the tire 2, so that the most rapid and accurate filling of the tire 2 would be achieved.

The pressure sensor coupled to the side port 78 of the column 70 is preferably in the form of the Bourdon tube 100. The Bourdon tube 100 is similar to those well known in the prior art consisting of a coil of metal with a hollow interior, and with walls of the coil sufficiently thin so that the coil becomes slightly unwound as increasing pressure within an interior of the coil is experienced. The Bourdon tube 100 can either spiral in a planar fashion (referred to as a radial spiral) or can spiral in a helical fashion (referred to as a helical spiral. The Bourdon tube 100 thus includes an inner end 102 coupled to the side port 78 and extends in a spiral fashion to an outer end 104. An indicator 106 is typically attached near the outer end 104.

Indicia are preferably provided adjacent the indicator 106 which provide particular pressure readings that are accurate when the indicator 106 is located adjacent those indicia. The indicia 62 (FIG. 1) could be painted or otherwise formed upon the window 34 of the upper body 30, or could be included upon a separate disc within the chamber 60 or upon portions of the lower body 20 so that they could still be viewed through the window 34 of the upper body 30. Alternatively, a separate sensor could generate an electronic signal based on a position of the indicator 106 so that the pressure indicated by the Bourdon tube 100 would be encodable into an electronic signal which could then be transmitted or caused to actuate a display to read out pressure values to a user. In more complex variations on the gauge 10, lights could be included or luminescent material utilized so that the indicia and indicator 106 could all be successfully read in low light or no light conditions.

Figure 6:
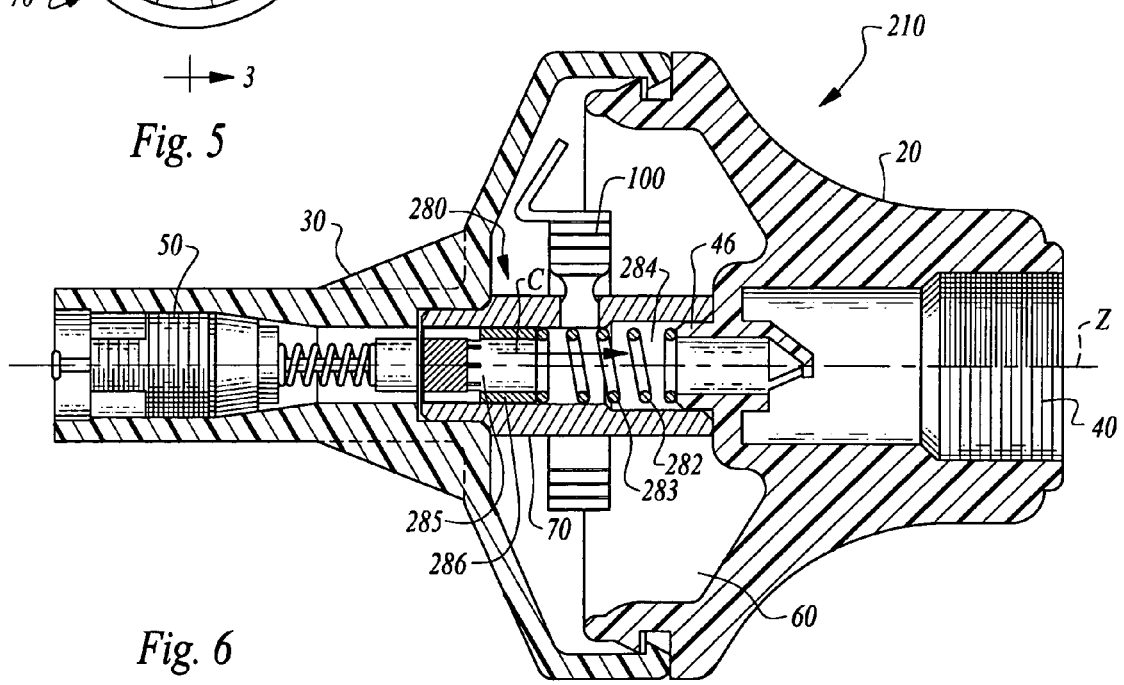
FIG. 6 is a full sectional view of a second embodiment of the gauge of this invention featuring a slide/spring type sensor protector for the pressure sensor of the gauge.
Figure 7:
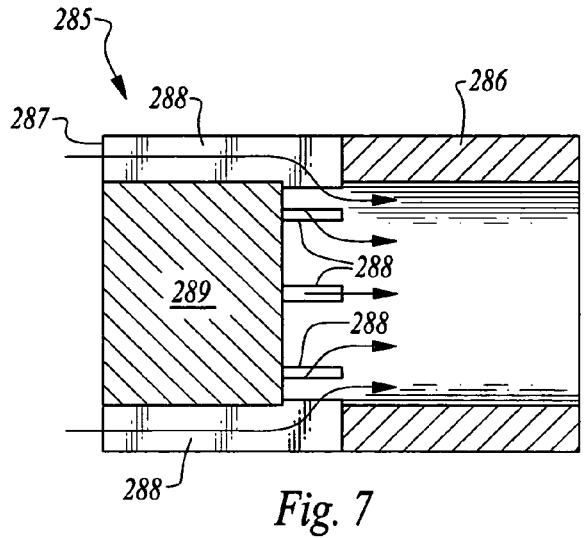
FIG. 7 is a full sectional view of a slide/spring of the embodiment of FIG. 6 oriented within the central column along the path between the valve core and the receiver of the gauge.
Figure 8:
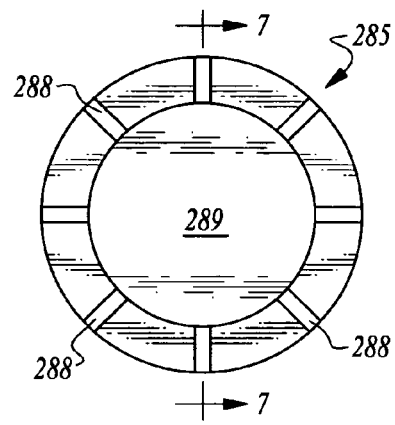
FIG. 8 is a left end view of that which is shown in FIG. 7.

With particular reference to FIGS. 6–8, particular details of a gauge 210 according to a second embodiment are described. With this gauge 210, the venturi protector 80 of the first embodiment is replaced with a slide/spring protector 280 for the sensor protector according to this embodiment. The slide/spring protector 280 resides within the column 70 and only details of the unique protector 280 are described, with other details of the gauge 210 similar to those of the gauge 10 of the first embodiment.

The slide/spring protector 280 includes a spring 282 located within the column 70 and abutting a shortened form of the cylinder 46 of the receiver 40. The spring 282 includes multiple turns 283 with gaps 284 therebetween in the general form of a helical compression spring 282. A slide 285 abuts an end of the spring 282 opposite the cylinder 46 of the receiver 40. The slide 285 (FIGS. 7 and 8) includes a side wall 286 which is cylindrical in form and particularly adapted to cover the side port 76 of the column 70 when the spring 282 is compressed sufficiently so that the side wail 286 is located adjacent the side port 78. When the side wall 286 is spaced from the side port 78, such as when the spring 282 is in its fully extended position, the side port 78 remains open.

The slide 285 includes an upstream end 287 which faces the valve core 50. Airflow slots 288 are formed in the upstream end 287 and extend down into the slide 285 preferably about half of an overall length of the slide 285. A plug 289 is provided at the upstream end 287 which extends into a hollow cylindrical interior of the slide 285 a distance short of a midpoint of the slide 285. Thus, the airflow slots 288 can pass around the plug 289 to pass from the upstream end 287 to the interior space bounded by the side wall 286 and on to the receiver 40.

The airflow slots 288 sufficiently constrict airflow and the upstream end 287 is sufficiently blunt that significant pressure forces are applied to the upstream end 287 of the slide 285. These forces cause the slide 285 to move downstream (along arrow C of FIG. 6) and cause the spring 282 to compress somewhat. The spring 282 is calibrated so that when the pressure of the air encountering the slide 285 is less than a maximum pressure for the pressure sensor, such as the Bourdon tube 100, the side wall 286 is not covering the side port 78 of the column 70. However, when this pressure encountered by the slide 285 is greater than a maximum safe pressure for the Bourdon tube 100 or other pressure sensor, the side wall 286 of the slide 285 covers the side port 78, through compression of the spring 282 and moving with the slide 285, so that such dangerously high pressure air or other gas cannot access the Bourdon tube 100 or other pressure sensor, and any such damage is avoided.

Figure 9:
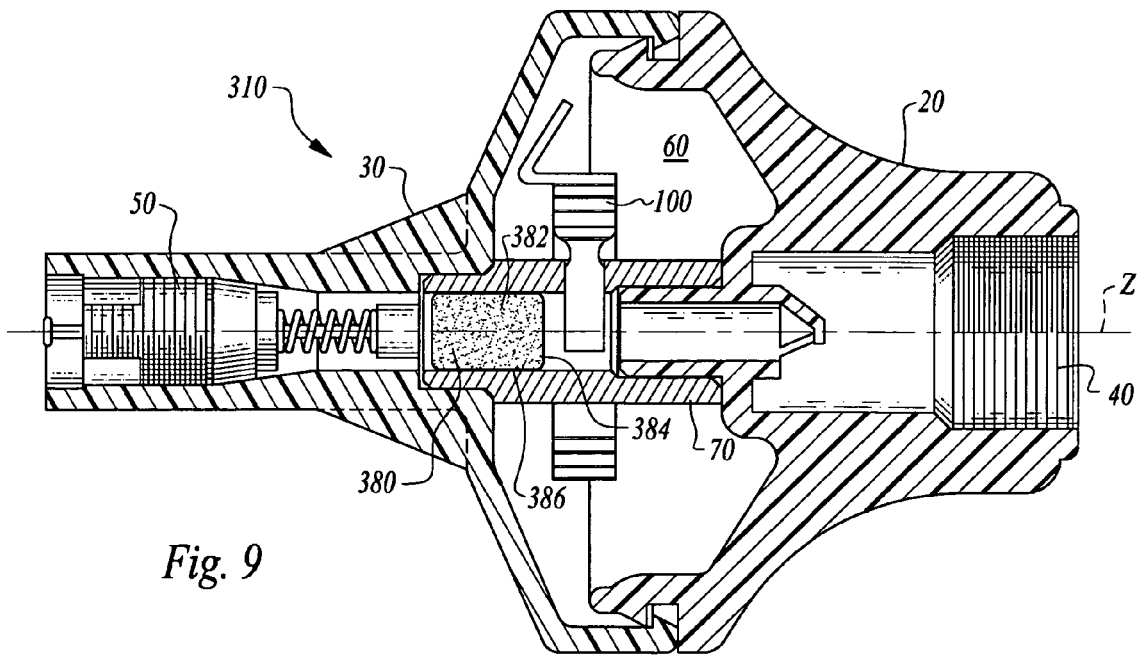
FIG. 9 is a full sectional view of a third embodiment gauge of this invention featuring a filter flow type pressure sensor protector.
Figure 10:
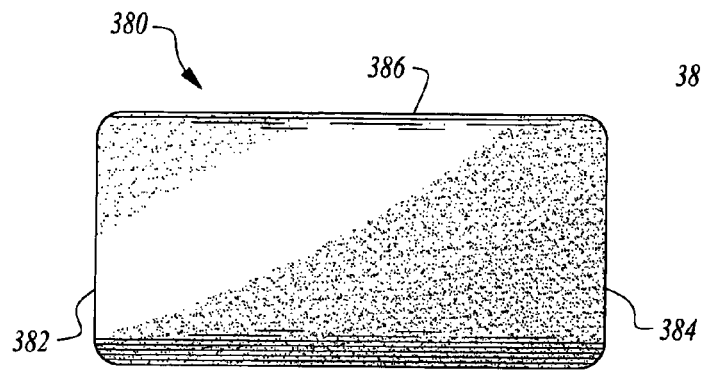
FIG. 10 is a full sectional view of the porous mass making up the filter flow sensor protector within the gauge of the third embodiment.
Figure 11:
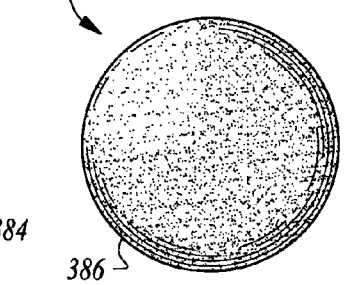
FIG. 11 is a right end view of that which is shown in FIG. 10.
Figure 12:
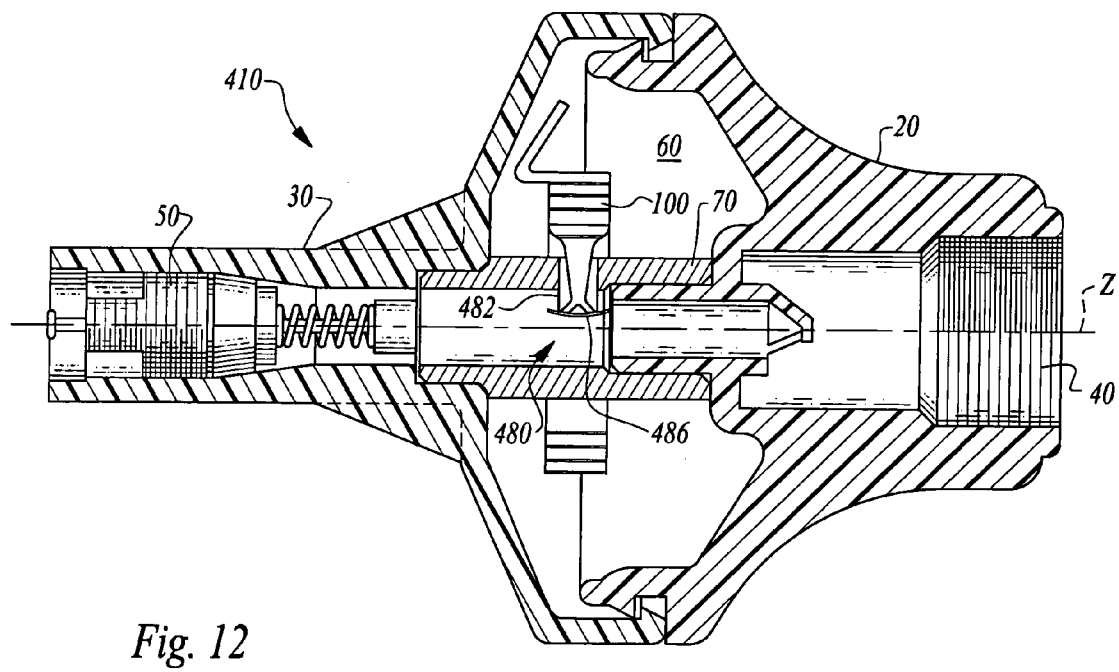
FIG. 12 is a full sectional view of a fourth embodiment gauge including a flexible plate pressure sensor protector therein.
Figure 16:
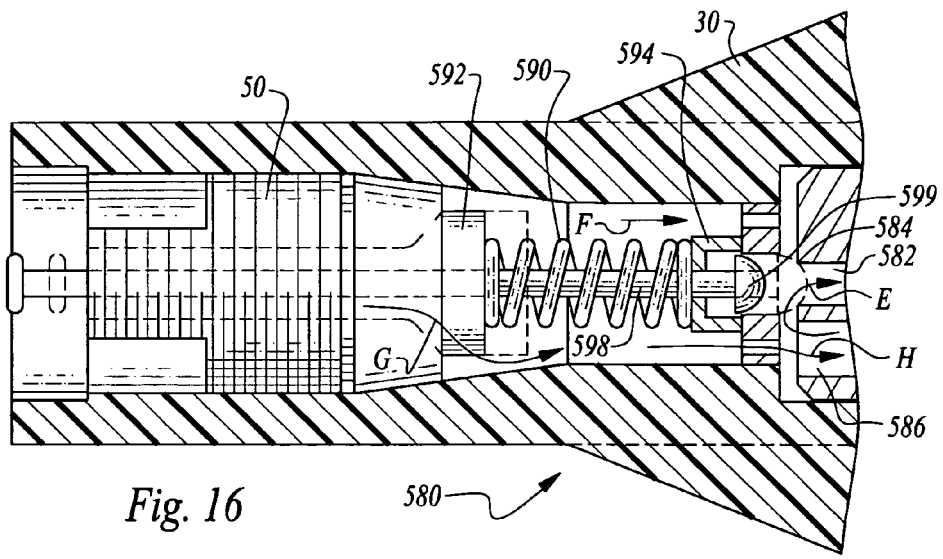
FIG. 16 is a detail of a portion of a fifth embodiment gauge shown also in FIG. 19.
Figure 17:
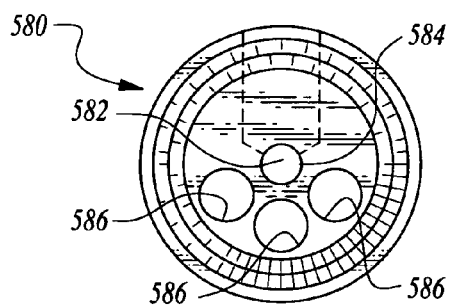
FIG. 17 is a sectional view taken along line 17—17 of FIG. 19.
Figure 18:
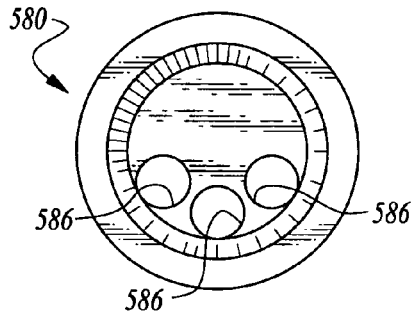
FIG. 18 is a sectional view taken along line 18—18 of FIG. 19.
Figure 19:
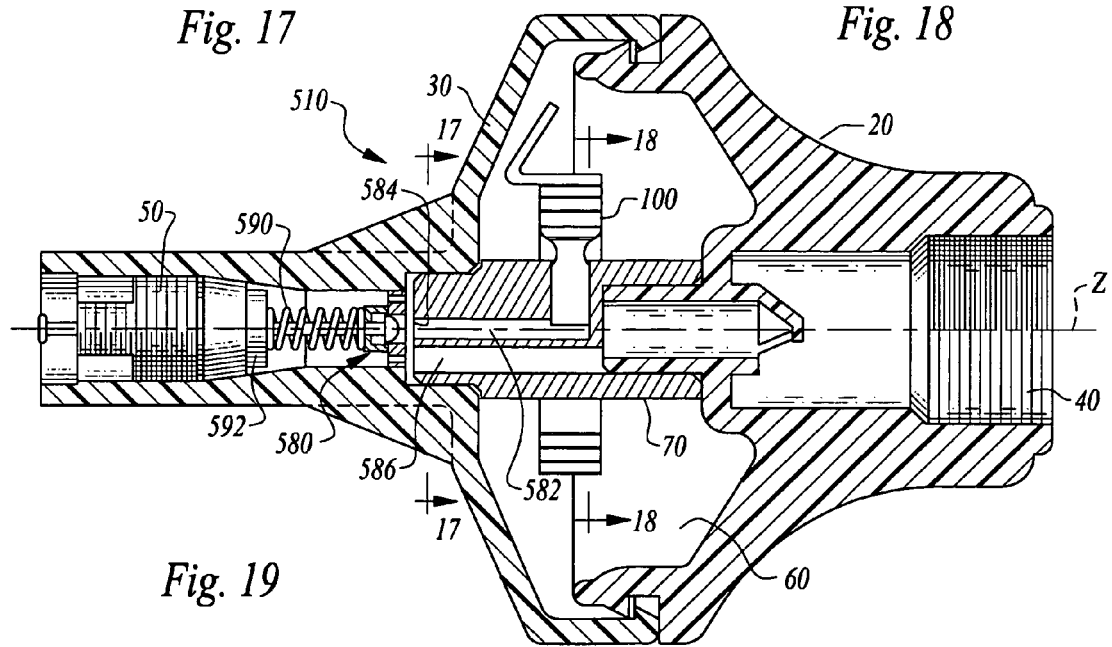
FIG. 19 is a full sectional view of the fifth embodiment gauge with a valve core actuated stopper for protection of the Bourdon tube or other pressure sensor.

With particular reference to FIGS. 9–11, particular details of a gauge 310 according to a third embodiment are described. The gauge 310 features a filter flow protector 380 substituting the venturi protector 80 of the gauge 10 of the first embodiment. Other details of the gauge 310 of the third embodiment are similar to those of the gauge 10 of the first embodiment.

In particular, the filter flow protector 380 is merely a mass of porous material extending from a first end 383 to a second end 384 and having a side surface 386 which is cylindrical and similar in diameter to an interior diameter of the column 70. The filter flow protector 380 is preferably located within the column 70 just upstream of the side port 78. This filter flow protector 380 is most preferably formed by taking stainless steel particles and cold pressing them together until they are bounded together. Alternatively, heat can be applied such that the particles are sintered together, or they could be coupled together through some form of adhesive. Other materials for the filter flow protector 380 could alternatively be utilized, such as brass, other metals or non-metal materials. This filter flow protector 380 would have numerous microscopic pathways extending from the first end 382 to the second end 384. However, none of these pathways would be straight. Rather, they would be tortuous and involve significant intimate contact against surface structures. Hence, a high degree of friction pressure losses would be encountered, particularly when relatively high flow rates are involved for air or other gases passing through the filter flow protector 380. The size of gaps between particles in the filter flow protector 380 would be selected based on the pressure and flow rates expected to be supplied by the air compressor 6 or other source of compressed air/gas and the safe range of pressures that can be experienced by the Bourdon tube 100 or other pressure sensor. The filter flow protector 380 would then be configured so that it causes a pressure loss which is sufficient so that after the air has passed through the filter flow protector 380, the pressure is now at a safe lower pressure which will not damage the Bourdon tube 100 or other pressure sensor.

While the filter flow protector 380 is preferably located upstream of the side port 78 and within the column 70, the filter flow protector 380 could alternatively be formed within the side port 78 of the column 70 itself or otherwise within the inner end 102 of the Bourdon tube 100, so that the path extending from the valve core 50 to the receiver 40 would not be blocked (or only partially blocked) by the filter flow protector 380, but rather only air passing into the Bourdon tube 100 or other pressure sensor would experience the pressure reduction associated with passage through the filter flow protector 380.

After fill air has been applied, and the air or other gas within the gauge 310 is no longer moving, pressure will reach equilibrium through the filter flow protector 380 relatively rapidly. The Bourdon tube 100 or other pressure sensor will then read accurate pressure once a static pressure condition exists within the tire 2 and gauge 310.

With particular reference to FIGS. 13–15, details of a gauge 410 according to a fourth embodiment, and featuring a flexible plate protector 480 are described. Other details of the gauge 410 are similar to those of the gauge 10 of the first embodiment described in detail above. The flexible plate protector 480 is a protector placed over an extension tube 482 surrounding a side port 78 in the column 70 and leading to the Bourdon tube 100 or other pressure sensor. A free end 484 of this extension tube 482 defines an entrance 485 into the tube 482.

A restriction plate 486 is located adjacent the entrance 485 of the free end 484 of the extension tube 482. This restriction plate 486 is generally in the form of a circular disc according to the preferred embodiment and with a conical taper which is oriented so that it tapers away from the entrance 485 of the extension tube 482. Fill holes 488 pass through this restriction plate 486, allowing air or other gases to flow through the restriction plate 486 and into the extension tube 482 and on to the Bourdon tube 100 or other pressure sensor. A center of the restriction plate 486 includes a conical seal 489 therein which extends toward the entrance 485. The entrance has a diameter less than a diameter of the conical seal 489. The entire restriction plate 486 is formed of a sufficiently flexible material and is sufficiently thin so that when a pressure differential is experienced between the outside of the extension tube 482 and inside of the extension tube 482, the restriction plate 486 flexes. If the pressure differential is sufficiently high, the conical seal 489 abuts the entrance 485 (arrow D of FIG. 15).

The design of the restriction plate 486 is carefully crafted so that only dangerously high pressure conditions cause the restriction plate 486 to transition to the closed position to protect the Bourdon tube 100 or other pressure sensor. Thus, once the tire 2 is filled and the source of dangerously high pressure air has been removed, the restriction plate 486 returns at least partially to its original position, so that air can pass through the flow holes 458 and further provide equilibrium both inside the extension tube 482 and outside the extension tube 482, and so that the restriction plate 486 can further return to its original position.

While the extension tube 482 is shown in this fourth embodiment extending perpendicular to the central axis Z, the extension tube 482 could include a bend therein or otherwise be configured so that it faces upstream either partially or completely, and with the restriction plate 486 at the free end 484 of the extension tube 482.

With particular reference to FIGS. 16–19, details of a gauge 510 according to a fifth embodiment are described. This gauge 510 is similar to the gauge 10 of the first embodiment (FIGS. 1 and 2) except that the venturi protector 80 of the first embodiment is replaced with the stopper protector 580 of the gauge 510. Details of the stopper protector 580 are described herein, with other portions of the gauge 510 preferably remaining similar to those described above with respect to the gauge 10 of the first embodiment, except where otherwise provided.

In particular, the stopper protector 580 includes the standard column 70 modified from its depiction in other embodiments to uniquely be substantially solid except where a tube path 582 passes, along the central axis Z, from an upstream side of the column to the side port where this tube path 582 provides access into the Bourdon tube 100 or other pressure sensor. This tube path 582 has a rim 584 surrounding an entrance into the tube path 582 at the upstream end of the column. While the tube path 582 is shown as being cylindrical, it could have other configurations so long as it provides for fluid flow from the rim 584 to the Bourdon tube 100 or other pressure sensor.

At least one side bore 586, and preferably three (or more), passes entirely through the column along paths separate from the tube path 582. These side bores 586 pass entirely through the column so that air or other gases are allowed to pass entirely from the valve core 50 to the receiver 40 of the gauge 510.

The stopper protector 580 includes the valve core 50 modified slightly from other embodiments to allow for selective blockage of the tube path 582 at the rim 584. In particular, a core spring 590 is provided as part of the valve core 50 which extends from a valve plug 592 at an upstream side of the core spring 590 to a base 594 at a downstream end of the core spring 590. The base 594 abuts against a ledge 595 formed as part of the upper body 30 of the gauge 510. Thus, the base 594 is held against the ledge 594 when the valve core 50 is press fit into the upper body 30. The valve plug 592 is usually pressed against the valve assembly of the valve core 50 through action of the core spring 590. However, when the needle of the valve core 50 is depressed, this valve plug 592 is opened and the core spring 590 is compressed somewhat. Air can then pass around the valve plug 592, such as high pressure fill air, to pass through the gauge 510 from the valve core 50 to the receiver 40 (along arrow G of FIG. 16).

Before this core spring 590 is compressed through translation of the needle of the valve core 50 (along arrow F of FIG. 16), the core spring 590 biases the valve plug 592 towards its closed position so that fill air cannot pass into the gauge 510 and so that leakage of compressed air from the tire through the valve core 50 is prevented. The needle extends through the valve plug 592 and continues on as a rod 598 passing along the central axis Z and through the core spring 590. This rod 598 also passes through the base 594 and terminates at a stopper 599. This stopper 599 is located slightly away from the rim 584 of the tube path 582 when the needle of the valve core 50 is not depressed. Thus, the tube path 582 is in open relationship with the interior of the tire 2 through the side bores 586 and through the rim 584 of the tube path 582 (along arrow E of FIG. 16). When the valve core 50 is closed the Bourdon tube 100 or other pressure sensor is in communication with an interior of the tire 2 through the gauge 510 so that an accurate pressure reading can be provided.

When the valve core 50 is opened and the needle is displaced (along arrow F of FIG. 16) so that the core spring 590 is compressed, the rod 598 is translated (also along arrow F of FIG. 16) until the stopper 599 abuts the rim 584 of the tube path 582. The stopper 599 seals the tube path 582, blocking off access to the Bourdon tube 100 or other pressure sensor. At this same time, the valve plug 592 is opened so that fill air can pass through the valve core 50, through the side bores 586, through the receiver 40 and on to the tire 2 (FIG. 1) or other compressed air filled chamber.

The base 594 provides for proper alignment of the rod 598 so that the stopper 599 remains aligned with the rim 584 of the tube path 582. The base 594 also supports one end of the core spring 590. The base 594 also includes holes passing therethrough, or the ledge 595 includes holes 596 passing therethrough so that when the valve core 50 is open with the valve plug 592 moved away from the valve assembly of the valve core 50 and compressed air is allowed to pass through the valve core 50, it can pass through either the base 594 or the ledge 595, so that it can access the side bores 586 and pass on to the receiver 40 and tire (along arrow H of FIG. 16).

While the stopper protector 580 provides a preferred form of sensor protector for the gauge 510, other valve core 50 actuated stoppers or other valves could be provided to seal off access to the Bourdon tube 100 or other sensor in conjunction with opening of the valve core 50 and translation of the needle thereof. For instance, the needle of the valve core 50 could merely be extended and coupled directly to a slide such as the slide 285 of the slide spring protector 280 associated with the gauge 210 (FIG. 6). With such an arrangement, translation of the needle of the valve core 50 would merely cause the slide 280 to translate along the central axis Z (along arrow C of FIG. 6) until the slide blocks the port leading to the Bourdon tube 100 or other pressure sensor.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure.

For instance, while the gauges of the various embodiments are shown with both the valve core 50 and the receiver 40 aligned with the same central axis Z, the gauges could be alternatively configured so that the valve core 50 and receiver 40 are skewed relative to each other and aligned with separate axes that are not aligned with each other. The relative axial alignments could be perpendicular to each other or have other angular displacements. Examples of such configurations and other variations adaptable to this invention are described in U.S. patent application Ser. No. 11/335,016, incorporated herein by reference in its entirety.

When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A pressure gauge featuring over-pressure protection for a pressure sensing element, the gauge comprising in combination:
   a receiver adapted to mount to a valve stem of a gas chamber which is to have its pressure monitored by said pressure gauge;
   a valve core coupled to a path extending to said receiver, said valve core adapted to be coupled to a source of gas at a higher pressure than gas within the gas chamber;
   a pressure sensor in fluid communication with said path at a port between said valve core and said receiver; and
   a sensor protector adjacent said port and between said valve core and said pressure sensor, said sensor protector adapted to limit a fluid pressure encountered by said pressure sensor to a pressure less than a pressure of gas entering said valve core wherein said sensor protector includes a divider wall adapted to route gas traveling from said valve core to said receiver along a side of said divider wall opposite said pressure sensor, with said pressure sensor primarily only in fluid communication with said path at a location downstream from said divider wall, such that a venturi effect reduces a pressure sensed by said pressure sensor when gas is flowing from said valve core to said receiver.

2. The gauge of claim 1 wherein said pressure sensor includes a Bourdon tube with an inner end coupled to said port.

3. The gauge of claim 1 wherein said divider wall includes an upstream slanting portion and a parallel portion downstream from said slanting portion, said divider wall terminating at a tip defining a portion of said divider wall extending most downstream.

4. The gauge of claim 3 wherein said tip of said divider wall is located further downstream than an entrance into said pressure sensor.

5. The gauge of claim 1 wherein said sensor protector includes a valve adapted to at least partially close when a pressure of gas within said path is greater than a maximum pressure selected for access to said pressure sensor, said valve interposed between said valve core and said pressure sensor.

6. The gauge of claim 5 wherein said valve includes a spring with said spring adapted to bias said valve toward an open position and with said spring adapted to be compressed an amount at least somewhat proportional to a pressure of gas within said path.

7. The gauge of claim 6 wherein said sensor protector includes a slide adapted to move longitudinally along said path, said slide including a side wall adapted to block an entrance to said pressure sensor when said spring is compressed at least partially.

8. The gauge of claim 7 wherein said slide includes slots therein which allow gas to flow through said slide and along said path, with said slots restricting gas flow through said slide sufficient to cause said slide to move and compress said spring when pressure of gas within said path is greater than the maximum pressure for said pressure sensor.

9. The gauge of claim 1 wherein said sensor protector includes a porous mass of material interposed between said pressure sensor and said valve core, said porous mass adapted to sufficiently introduce fluid flow friction losses into fluid flow along said path to reduce a pressure of gas downstream from said porous mass.

10. The gauge of claim 9 wherein said porous mass includes a plurality of particles of stainless steel cold pressed together.

11. The gauge of claim 1 wherein said sensor protector includes a flexible plate overlying an entrance to said pressure sensor, said flexible plate adapted to flex between an open position allowing gas to pass into said entrance and a closed position with said entrance to said sensor at least partially blocked, said flexible plate adapted to flex between said open position and said closed position responsive to pressure of gas within said path.

12. The gauge of claim 11 wherein said flexible plate includes a seal engaging said entrance to said pressure sensor when said flexible plate is in said closed position, such that said entrance to said pressure sensor is entirely blocked when said flexible plate is in said closed position.

13. The gauge of claim 12 wherein said flexible plate is conical in form with a circular periphery abutting said entrance, said entrance having a circular form, said flexible plate having a seal at a center portion thereof having a width at least as great as a width of said entrance, said flexible plate including holes between said circular periphery of said flexible plate and a center of said flexible plate, said holes allowing gas to pass through said flexible plate, through said entrance and to said sensor when said flexible plate is in said open position, and with said conical seal abutting said entrance and blocking said entrance when said flexible plate transitions to said closed position.

14. An over-pressure safe Bourdon tube pressure sensor adapted to be coupled to a path between a high pressure fluid source and an elevated pressure fluid chamber to be filled from said high pressure fluid from said fluid source, the tube comprising in combination:
   a spiraling hollow Bourdon tube having an open inner end and a closed outer end;
   an indicator coupled to said Bourdon tube adjacent said closed end;
   a port adjacent said inner end and adapted to be placed adjacent the path; and a tube protector adjacent said port and between the high pressure fluid source and said port, said protector adapted to prevent over-pressure fluid from passing into said inner end of said tube wherein said tube protector includes a divider wall located within a path between the high pressure fluid source and the elevated pressure fluid chamber, the divide wall adapted to route gas traveling from the high pressure fluid source to the elevated pressure fluid chamber along a side of said divider wall opposite said pressure sensor, with said pressure sensor primarily only in fluid communication with said path at a location downstream from said divider wall, such that a venture effect reduces a pressure sensed by said pressure sensor when gas is flowing from the high pressure fluid source to the elevated pressure fluid chamber.

15. The tube of claim 14 wherein said divider wall includes an upstream slanting portion and a parallel portion downstream from said slanting portion, said divider wall terminating at a tip defining a portion of said divider wall extending most downstream; and wherein said tip of said divider wall is located further downstream than said port adjacent said inner end of said Bourdon tube.

16. The tube of claim 14 wherein said tube protector includes a valve adapted to at least partially close when a pressure of gas within the high pressure fluid source is greater than a maximum pressure selected for access to said port, said valve interposed between the high pressure fluid source and said port.

17. The tube of claim 16 wherein said valve includes a spring with said spring adapted to bias said valve toward an open position and with said spring adapted to be compressed an amount at least somewhat proportional to a pressure of gas within the high pressure fluid source;

wherein said tube protector includes a slide adapted to move longitudinally along a path extending between the high pressure fluid source and the elevated pressure fluid chamber, said slide including a side wall adapted to block said port to said tube when said spring is compressed at least partially; and wherein said slide includes slots therein which allow gas to flow through said slide and along said path, with said slots restricting gas flow through said slide sufficient to cause said slide to move and compress said spring when pressure of gas within said path is greater than the maximum pressure for said tube.

18. The tube of claim 14 wherein said tube protector includes a porous mass of material interposed between said pressure sensor and the high pressure fluid source, said porous mass adapted to sufficiently introduce fluid flow friction losses into fluid flow upstream of said port to reduce a pressure of gas downstream from said porous mass.

19. The tube of claim 14 wherein said sensor protector includes a flexible plate overlying said port, said flexible plate adapted to flex between an open position allowing gas to pass into said port and a closed position with said port at least partially blocked, said flexible plate adapted to flex between said open position and said closed position responsive to pressure of gas upstream of said port.

20. The tube of claim 19 wherein said flexible plate includes a seal engaging said port when said flexible plate is in said closed position such that said port is entirely blocked when said flexible plate is in said closed position; and wherein said flexible plate is conical in form with a circular periphery abutting said port, said port having a circular form, said flexible plate having a seal at a center portion thereof having a width at least as great as a width of said port, said flexible plate including holes between said circular periphery of said flexible plate and a center of said flexible plate, said holes allowing gas to pass through said flexible plate, through said port and onto said tube when said flexible plate is in said open position, and with said conical seal abutting said port and blocking said port when said flexible plate transitions to said closed position.

21. A method for filling a tire with gas through a tire pressure sensing gauge using fill gas at a pressure higher than a safe maximum pressure for a pressure sensing element of the gauge, and without damaging the pressure sensing element, the method including the steps of:

providing a tire pressure sensing gauge including a receiver adapted to mount to a valve stem of a gas chamber which is to have its pressure monitored by said pressure gauge; a valve core coupled to a path extending to said receiver, said valve core adapted to be coupled to a source of gas at a higher pressure than gas within the gas chamber; a pressure sensor in fluid communication with said path at a port between said valve core and said receiver; and a sensor protector adjacent said port and between said valve core and said pressure sensor, said sensor protector adapted to limit a fluid pressure encountered by said pressure sensor to a pressure less than a pressure of gas entering said valve core;

locating the receiver of the gauge on a valve stem of the tire to be filled;

coupling a source of fill gas to the valve core;

reading a pressure within the tire by viewing the pressure sensor; and routing fill gas from the source of fill gas into the tire while allowing the sensor protector of the gauge to protect the pressure sensor wherein said providing step includes the further step of configuring said sensor protector to include a divider wall adapted to route gas traveling from said valve core to said receiver along a side of said divider wall opposite said pressure sensor, with said pressure sensor primarily only in fluid communication with said path at a location downstream from said divider wall, such that a venturi effect reduces a pressure sensed by said pressure sensor when gas is flowing from said valve core to said receiver.

22. The method of claim 21 including the additional steps of:

stopping said routing step;

repeating said reading step; and continuing said routing step, said stopping step and said reading step until said reading step shows that the tire has achieved a desired pressure.

23. The method of claim 21 including the further step of repeating said reading step during said routing step until said reading step shows that the tire has achieved a desired pressure.

24. The method of claim 21 wherein said providing step includes the further step of configuring the sensor protector to include an upstream slanting portion and a parallel portion downstream from said slanting portion, said divider wall terminating at a tip defining a portion of said divider wall extending most downstream; and configuring said tip of said divider wall is located further downstream than an entrance into said pressure sensor.

25. The method of claim 21 wherein said providing step includes the further step of configuring the sensor protector to include a valve adapted to at least partially close when a pressure of gas within said path is greater than a maximum pressure selected for access to said pressure sensor, said valve interposed between said valve core and said pressure sensor.

26. The method of claim 25 wherein said providing step includes the further step of configuring the sensor protector to include a spring with said spring adapted to bias said valve toward an open position and with said spring adapted to be compressed an amount at least somewhat proportional to a pressure of gas within said path; wherein said sensor protector includes a slide adapted to move longitudinally along said path, said slide including a side wall adapted to block an entrance to said pressure sensor when said spring is compressed at least partially; and wherein said slide includes slots therein which allow gas to flow through said slide and along said path, with said slots restricting gas flow through said slide sufficient to cause said slide to move and compress said spring when pressure of gas within said path is greater than the maximum pressure for said pressure sensor.

27. The method of claim 21 wherein said providing step includes the further step of configuring the sensor protector to include a porous mass of material interposed between said pressure sensor and said valve core, said porous mass adapted to sufficiently introduce fluid flow friction losses into fluid flow along said path to reduce a pressure of gas downstream from said porous mass.

28. The method of claim 21 wherein said providing step includes the further step of configuring the sensor protector to include a flexible plate overlying an entrance to said pressure sensor, said flexible plate adapted to flex between an open position allowing gas to pass into said entrance and a closed position with said entrance to said sensor at least partially blocked, said flexible plate adapted to flex between said open position and said closed position responsive to pressure of gas within said path.

29. The method of claim 28 wherein said providing step includes the further step of configuring the sensor protector to include a seal engaging said entrance to said pressure sensor when said flexible plate is in said closed position such that said entrance to said sensor is entirely blocked when said flexible plate is in said closed position; and wherein said flexible plate is conical in form with a circular periphery abutting said entrance, said entrance having a circular form, said flexible plate having a seal at a center portion thereof having a width at least as great as a width of said entrance, said flexible plate including holes between said circular periphery of said flexible plate and a center of said flexible plate, said holes allowing gas to pass through said flexible plate, through said entrance and onto said sensor when said flexible plate is in said open position, and with said conical seal abutting said entrance and blocking said entrance when said flexible plate transitions to said closed position.

* * * * *